(12) United States Patent
Zhang et al.

(10) Patent No.: US 11,775,845 B2
(45) Date of Patent: Oct. 3, 2023

(54) CHARACTER RECOGNITION METHOD AND APPARATUS, ELECTRONIC DEVICE AND COMPUTER READABLE STORAGE MEDIUM

(71) Applicant: Beijing Baidu Netcom Science and Technology Co., LTD, Beijing (CN)

(72) Inventors: Xiaoqiang Zhang, Beijing (CN); Chengquan Zhang, Beijing (CN); Shanshan Liu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 205 days.

(21) Appl. No.: 17/209,380

(22) Filed: Mar. 23, 2021

(65) Prior Publication Data

US 2021/0209401 A1 Jul. 8, 2021

(30) Foreign Application Priority Data

Jun. 30, 2020 (CN) .......................... 202010616043.8

(51) Int. Cl.
*G06N 5/00* (2023.01)
*G06N 5/022* (2023.01)
(Continued)

(52) U.S. Cl.
CPC ........... *G06N 5/022* (2013.01); *G06V 10/764* (2022.01); *G06V 20/62* (2022.01); *G06V 30/153* (2022.01);
(Continued)

(58) Field of Classification Search
CPC .... G06V 30/153; G06V 30/274; G06V 30/10; G06V 10/764; G06V 30/18181;
(Continued)

(56) References Cited

U.S. PATENT DOCUMENTS 6,128,606 A    10/2000  Bengio et al.
10,878,269 B2 *  12/2020  Stark ................ G06V 30/19173
(Continued)

FOREIGN PATENT DOCUMENTS

CN    107608943 A    1/2018
CN    108647591 A    10/2018
(Continued)

OTHER PUBLICATIONS

Gao et al., Multi-Modal Graph Neural Network for Joint Reasoning on Vision and Scene Text, arXiv:2003.13962 Mar. 31, 2020.*
(Continued)

*Primary Examiner* — Nay A Maung
*Assistant Examiner* — Xiao Liu
(74) *Attorney, Agent, or Firm* — Banner & Witcoff, Ltd.

(57) ABSTRACT

A character recognition method, a character recognition apparatus, an electronic device and a computer readable storage medium are disclosed. The character recognition method includes: determining semantic information and first position information of each individual character recognized from an image; constructing a graph network according to the semantic information and the first position information of each individual character; and determining a character recognition result of the image according to a feature of each individual character calculated by the graph network.

9 Claims, 7 Drawing Sheets

(51) Int. Cl.
*G06V 30/148* (2022.01)
*G06V 30/262* (2022.01)
*G06V 30/18* (2022.01)
*G06V 30/196* (2022.01)
*G06V 10/764* (2022.01)
*G06V 20/62* (2022.01)
*G06V 30/10* (2022.01)

(52) U.S. Cl.
CPC .... *G06V 30/18181* (2022.01); *G06V 30/1988* (2022.01); *G06V 30/274* (2022.01); *G06V 30/10* (2022.01)

(58) Field of Classification Search
CPC .... G06V 20/62; G06V 30/1988; G06V 10/22; G06V 10/267; G06V 10/44; G06K 9/627; G06K 9/6267; G06N 3/08; G06N 3/0454; G06N 5/022
See application file for complete search history.

(56) References Cited

U.S. PATENT DOCUMENTS

| | | | |
|---|---|---|---|
| 2018/0025256 A1 | 1/2018 | Bai et al. | |
| 2019/0354818 A1* | 11/2019 | Reisswig | G06V 30/414 |
| 2021/0142093 A1* | 5/2021 | Colwell | G06N 3/08 |
| 2022/0036112 A1* | 2/2022 | Huang | G06V 30/153 |

FOREIGN PATENT DOCUMENTS

| | | | |
|---|---|---|---|
| CN | 109615006 A | | 4/2019 |
| CN | 110569846 A | | 12/2019 |
| CN | 111046671 A | | 4/2020 |
| CN | 111062389 A | | 4/2020 |
| CN | 111178363 A | * | 5/2020 |
| CN | 111178363 A | | 5/2020 |
| JP | 2000132639 A | * | 5/2000 |
| JP | 2000132639 A | | 5/2000 |
| JP | 2013246473 A | * | 12/2013 |
| JP | 2013246473 A | | 12/2013 |
| JP | 2019160285 A | | 9/2019 |
| WO | 2017067456 A1 | | 4/2017 |
| WO | 2023077995 A1 | | 5/2023 |

OTHER PUBLICATIONS

Ross Girshick, Fast R-CNN, arXiv:1504.08083v2 Sep. 27, 2015.*
Apr. 5, 2022—JP Office Action—App. No. 2021-051576.
Using Shortest Path Convergent Text Cuffing Method Proposal dated Jul. 2011, pp. 7.
Shortest path segmentation a method for training a neural network to recognize character strings, IEEE, 1992 pp. 165-172.
Oct. 14, 2021—(EP) EESR—App. No. 21163937.2.
Anonymous, "Optical Character Recognition", Wikipedia, Jun. 10, 2020, retrieved Sep. 22, 2021, pp. 11.
Jun. 3, 2023—(CN) First Search Report—App. No. 2020106160438 w/translation.
Duoyou, Zhou, "Design and Implementation of a Text-Based Image Retrieval Platform," Huazhong University of Science & Technology, Oct. 2017.
Wu, Qin, "Text Document Classification and Pattern Recognition," Department of Mathematics, West Virginia University, 2009, pp. 405-410.

* cited by examiner

CHARACTER RECOGNITION METHOD AND APPARATUS, ELECTRONIC DEVICE AND COMPUTER READABLE STORAGE MEDIUM

CROSS-REFERENCE TO RELATED APPLICATION

This application claims priority to Chinese Patent Application No. 202010616043.8, filed on Jun. 30, 2020, which is hereby incorporated by reference in its entirety.

TECHNICAL FIELD

The present application relates to the technical field of computer, in particular to the technical field of artificial intelligence, deep learning and computer vision technology.

BACKGROUND

The end-to-end character detection and recognition technology in natural scenes may be widely used in various industries in society, such as education, medical care, and finance. Common technologies derived from the character detection and recognition technology, such as recognition of cards and bills, automatic entry of documents and photo search, have greatly improved intelligence and production efficiency of traditional industries, and facilitated people's daily life and learning.

SUMMARY

The present application provides a character recognition method, a character recognition apparatus, an electronic device and a computer readable storage medium.

According to one aspect of the present application, a character recognition method is provided and includes:

determining semantic information and first position information of each individual character recognized from an image;

constructing a graph network according to the semantic information and the first position information of each individual character; and determining a character recognition result of the image according to a feature of each individual character calculated by the graph network.

According to another aspect of the present application, a character recognition apparatus is provided and includes:

a first determining module configured for determining semantic information and first position information of each individual character recognized from an image;

a construction module configured for constructing a graph network according to the semantic information and first position information of each individual character; and a second determining module configured for determining a character recognition result of the image according to a feature of each individual character calculated by the graph network.

According to another aspect of the present application, an electronic device is provided. Functions of the electronic device may be realized by hardware, or by hardware executing corresponding software. The hardware or software includes one or more modules corresponding to the foregoing functions.

In a possible design, the electronic device includes a processor and a memory. The memory is used to store a program that enables the electronic device to implement the foregoing character recognition method. The processor is configured to execute the program stored in the memory. The electronic device may further include a communication interface for communicating with other devices or a communication network.

According to another aspect of the present application, a non-transitory computer-readable storage medium storing computer instructions is provided. The non-transitory computer-readable storage medium is configured to store computer software instructions used by an electronic device, including programs used to perform the forgoing character recognition method.

It is to be understood that the contents in this section are not intended to identify the key or critical features of the embodiments of the present application, and are not intended to limit the scope of the present application. Other features of the present application will become readily apparent from the following description.

BRIEF DESCRIPTION OF THE DRAWINGS

The drawings are included to provide a better understanding of the application and are not to be construed as limiting the application. Wherein.

DETAILED DESCRIPTION

The exemplary embodiments of the present application are described below with reference to the accompanying drawings, which include various details of the embodiments of the present application to facilitate understanding, and should be considered as merely exemplary. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

In the related art, although the end-to-end character detection and recognition technology in natural scenes has been developed rapidly, it still has certain problems, such as inability to accurately recognize characters in images, character recognition errors or unrecognized situations.

Figure 1:
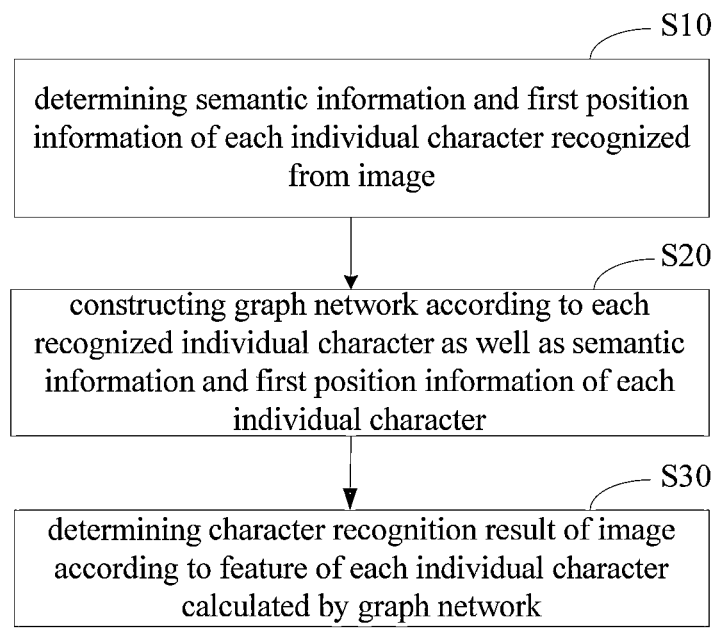
FIG. 1 is a schematic diagram of a character recognition method according to an embodiment of the present application.

According to an embodiment of the present application, as shown in FIG. 1, the present application provides a character recognition method, including the following steps.

S10: determining semantic information and first position information of each individual character recognized from an image.

The image may include a frame image in a video, a captured photo, a drawn image, a scanned image, etc. The image may include one or more individual characters. The individual character may include a word, a character, a number and a symbol and the like in various languages. For example, a Chinese character may be an individual character, a letter may be an individual character, a number may be an individual character, and a comma may also be an individual character. Each individual character recognized from the image may be an individual character actually displayed in the image, or may be an individual character which is not actually displayed in the image. In other words, one recognized individual character may be a correct recognition result or a wrong recognition result.

The semantic information may include any information related to the meaning of the recognized individual character, for example, relevant feature information that can indicate which character the individual character is. The semantic information of each individual character may include semantic information of each pixel corresponding to the individual character in an image, may also include semantic information of each feature point corresponding to the individual character, and may further include semantic information of feature points or pixels contained in a certain image area around the individual character. Specific information contained in the semantic information of each individual character, which is required to be obtained, may be selected and adjusted according to requirements, and is not specifically limited.

The first position information may include any information related to a position of the recognized individual character in the image, for example, related feature information that can indicate a distance between the individual character and an adjacent individual character, a distance of the individual character from an image boundary, and a distance of the individual character from an image center. The first position information of each individual character may include first position information of each pixel corresponding to the individual character in an image, may further include first position information of each feature point corresponding to the individual character, and may further include first position information of feature points or pixels contained in a certain image area around the individual character. Specific information contained in the first position information of each individual character, which needs to be obtained, may be selected and adjusted according to needs, which is not specifically limited.

It should be noted that the feature point and pixel mentioned in the present application have a conversion relationship and may be converted mutually. In other words, according to the semantic information and/or the first position information of the feature point mentioned in the present application, the semantic information and/or the first position information of the corresponding pixel can be obtained. According to the semantic information and/or the first position information of the pixel mentioned in the present application, the semantic information and/or the first position information of the corresponding feature point can also be obtained.

For example, one recognized individual character is "一" which corresponds to 10 pixels in an original image. When the original image is input to a neural network model for processing, the original image becomes a feature image, and each point in the feature image is a feature point. Since each feature point is calculated from a pixel in the original image, there is a conversion relationship between the feature point and the pixel, and corresponding conversion can be performed as needed.

S20: constructing a graph network according to each recognized individual character as well as the semantic information and the first position information of each individual character.

The network structure of the graph network may adopt any graph network structure in the related art. The specific network structure may be selected and adjusted as needed. The graph network may include a graph neural network or a graph convolutional neural network.

The constructing the graph network according to each recognized individual character as well as the semantic information and the first position information of each individual character, may specifically include: using each individual character as a node of the graph network, and using the semantic information and/or position information of each individual character to determine an edge relationship among respective nodes in the graph network, where the edge relationship is used to determine whether any two nodes have an association relationship, that is, whether they need to be connected. In other words, the graph network may include a graph network constructed based on the semantic information of each individual character, and a graph network constructed based on the position information of each individual character.

For example, the recognized individual characters include "a", "b" and "c". Then, "a", "b" and "c" are used as three nodes of a semantic graph network, respectively. Edge relationships among "a", "b" and "c" are determined through respective semantic information of "a", "b" and "c", i.e., determining how to connect the three nodes "a", "b" and "c". If there is an edge relationship between "a" and "b", "a" and "b" are connected. If it is not sure whether there is an edge relationship between "b" and "c", "b" and "c" are connected through a dotted line. If it is determined that there is no edge relationship between "a" and "c", then "a" and "c" are not connected.

The graph network is used to decode the semantic information and/or the first position information of each individual character, thereby calculating feature of each node (each individual character). The calculated features are used to represent relevant content of the individual character corresponding to the node. The feature of each node may include multiple features associated with the node. The feature of each node and/or the edge relationship among the nodes in the graph network will be updated in time-step during calculation. Updating modes may include synchronous updating and asynchronous updating. When updating synchronously, features of all nodes are updated in a time step. When updating asynchronously, features of only some nodes are updated in a time step. No matter which updating mode is adopted in the calculation process of the graph network, the feature of each node and the edge relationship among each node in a final graph network will be updated.

S30: determining a character recognition result of the image, according to a feature of each individual character calculated by the graph network.

The character recognition result of the image may include an individual-character-level recognition result, a word-level recognition result or a character-line-level recognition result of the image. The individual-character-level recognition result may be understood as finally recognized characters which contained in the image, and the characters may include Chinese characters, Arabic numerals, English letters or punctuation marks, etc. The word-level recognition result may be understood as finally recognized words which are contained in the image, and the words may include Chinese phrases, English words, etc. The character-line-level recognition result may include words or phrases in a line, or a sentence in a line.

In the embodiment of the present application, since the semantic information and the first position information of each individual character are decoded and calculated by the graph network, characters in the image can be more accurately recognized through the information of two dimensions, thereby solving the problem of inaccurate character recognition in images and improving accuracy of character recognition in images.

In this embodiment, since the graph network decodes and calculates the semantic information and the first position information of each individual character, the character in the image can be recognized accurately through information in two dimensions.

Figure 2:
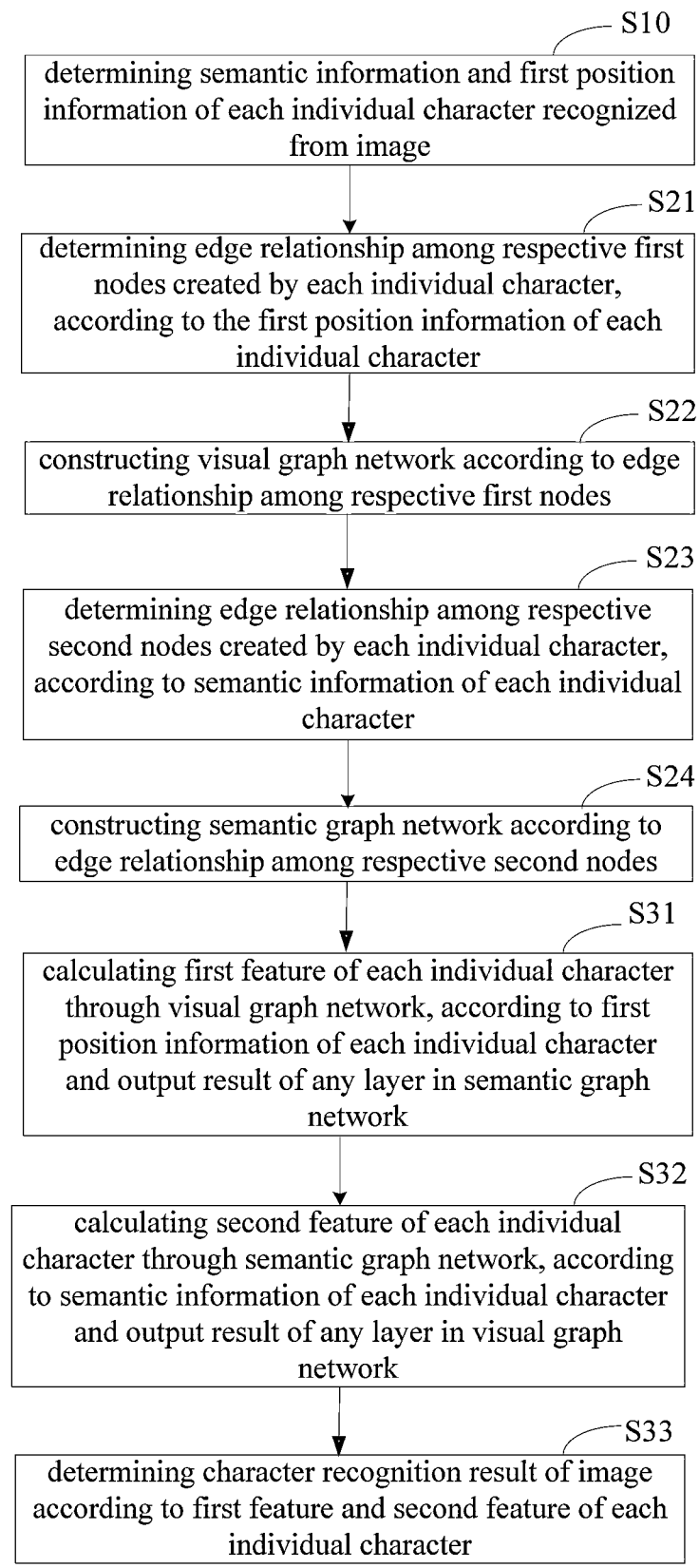
FIG. 2 is a schematic diagram of a character recognition method according to another embodiment of the present application.

In one embodiment, as shown in FIG. 2, a character recognition method including the steps S10 to S30 of the foregoing embodiment. Specific content of each step may refer to the description of the foregoing embodiment, which will not be repeated in this embodiment. The step S20 of the constructing the graph network according to each recognized individual character as well as the semantic information and the first position information of each individual character, may further include:

S21: determining an edge relationship among respective first nodes created by each individual character, according to the first position information of each individual character.

The edge relationship among respective first nodes may be obtained by performing distance calculation with the first position information of various individual characters. Specifically, it may be calculated according to feature vectors contained in the first position information of various individual characters.

S22: constructing a visual graph network according to the edge relationship among respective first nodes.

It should be noted that the edge relationship among respective first nodes determined in this step may be initial edge relationship. In other words, the edge relationship among respective first nodes may be correct or wrong. After the visual graph network is initially constructed, when the visual graph network uses the first position information of each individual character for calculation, the edge relationship among respective first nodes may also be optimized and adjusted. Meanwhile, in the calculation process of the visual graph network, the feature vector of the individual character corresponding to each first node is also adjusted. The feature vector of each first node is used to represent position-related information of the corresponding individual character.

S23: determining an edge relationship among respective second nodes created by each individual character, according to the semantic information of each individual character.

The edge relationship among respective second nodes may be obtained by performing distance calculation with the semantic information of various individual characters. Specifically, it may be calculated according to feature vectors contained in the first position information of various individual characters.

S24: constructing a semantic graph network according to the edge relationship among respective second nodes.

It should be noted that the edge relationship among respective second nodes determined in this step may be initial edge relationship. In other words, the edge relationship among respective second nodes may be correct or wrong. After the semantic graph network is initially constructed, when the semantic graph network uses the semantic information of each individual character for calculation, the edge relationship among respective second nodes may also be optimized and adjusted. Meanwhile, in the calculation process of the semantic graph network, the feature vector of the individual character corresponding to each second node is also adjusted. The feature vector of each second node is used to represent semantic-related information of the corresponding individual character.

Further, the step S30 of the determining the character recognition result of the image, according to the feature of each individual character calculated by the graph network, may further include:

S31: calculating a first feature of each individual character through the visual graph network, according to the first position information of each individual character and an output result of any layer in the semantic graph network.

When the visual graph network calculates the first feature of each individual character, the output result of any layer in the semantic graph network may be taken as an input of any layer in the visual graph network, so that the visual graph network can obtain more accurate first feature of each individual character via calculation.

S32: calculating a second feature of each individual character through the semantic graph network, according to the semantic information of each individual character and an output result of any layer in the visual graph network.

When the semantic graph network calculates the second feature of each individual character, the output result of any layer in the visual graph network may be taken as an input of any layer in the semantic graph network, so that the semantic graph network can obtain more accurate second feature of each individual character via calculation.

S33: determining the character recognition result of the image according to the first feature and the second feature of each individual character.

By combining the first feature and the second feature of each individual character, features in different dimensions of each individual character in the image can be obtained. Therefore, the first feature and the second feature of each individual character can be used to obtain more accurate character recognition result from the image.

It should be noted that there is no sequential execution order of the step S21 and the step S22 in this embodiment, and it should be understood that the step sequence numbers do not limit execution logical orders of the steps. In other words, in this embodiment, the step S21 may be executed first and then the step S22 may be executed, or the step S22 may be executed first and then the step S21 may be executed, or the steps S21 and S22 may be executed simultaneously.

In this embodiment, due to utilization of the graph network technology that can effectively process structured data and extract structured features, the constructed visual graph network and semantic graph network can effectively and accurately predict the feature of each node defined by each individual character and the edge relationship among the nodes.

Figure 3:
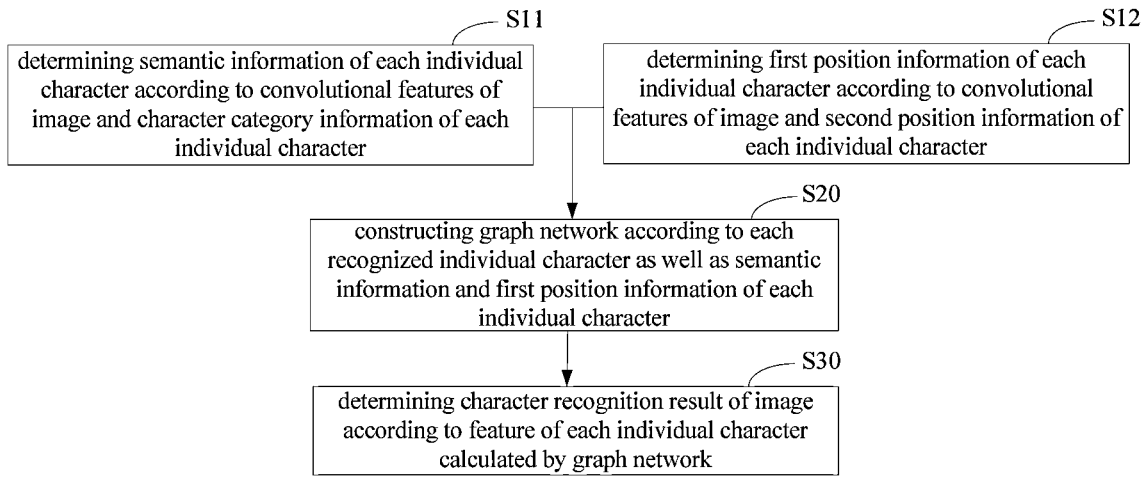
FIG. 3 is a schematic diagram of a character recognition method according to another embodiment of the present application.

In one embodiment, as shown in FIG. 3, a character recognition method including the steps S10 to S30 of the foregoing embodiment. Specific content of each step may refer to the description of the foregoing embodiment, which will not be repeated in this embodiment. The step S10 of determining semantic information and first position information of each individual character recognized from an image, may further include:

S11: determining the semantic information of each individual character according to convolutional features of the image and character category information of each individual character.

The semantic information of each individual character may include at least the character category information of each individual character and recognized convolutional features in a certain image area around each individual character. The convolutional features in a certain image area around each individual character may be obtained via a regional feature extraction technology.

S12: determining the first position information of each individual character according to the convolutional features of the image and second position information of each individual character.

The first position information of each individual character may include at least the second position information of each individual character, and recognized convolutional features in a certain image area around each individual character. The convolutional features in a certain image area around each individual character may be obtained via a regional feature extraction technology. The second position information may include coordinate information (x, y, w, h) and angle information (θ) of a pixel or a feature point corresponding to each individual character.

It should be noted that there is no sequential execution order of the step S11 and the step S12 in this embodiment, and it should be understood that the step sequence numbers do not limit execution logical orders of the steps. In other words, in this embodiment, the step S11 may be executed first and then the step S12 may be executed, or the step S12 may be executed first and then the step S11 may be executed, or the steps S11 and S12 may be executed simultaneously.

In this embodiment, by utilization of the convolutional features of the image and the character category information of each individual character, more accurate and highly relevant semantic information of each individual character can be obtained through multi-dimensional feature vectors. By utilization of the convolutional features of the image and the second position information of each individual character, more accurate and highly relevant first position information of each individual character can be obtained through multi-dimensional feature vectors.

Figure 4:
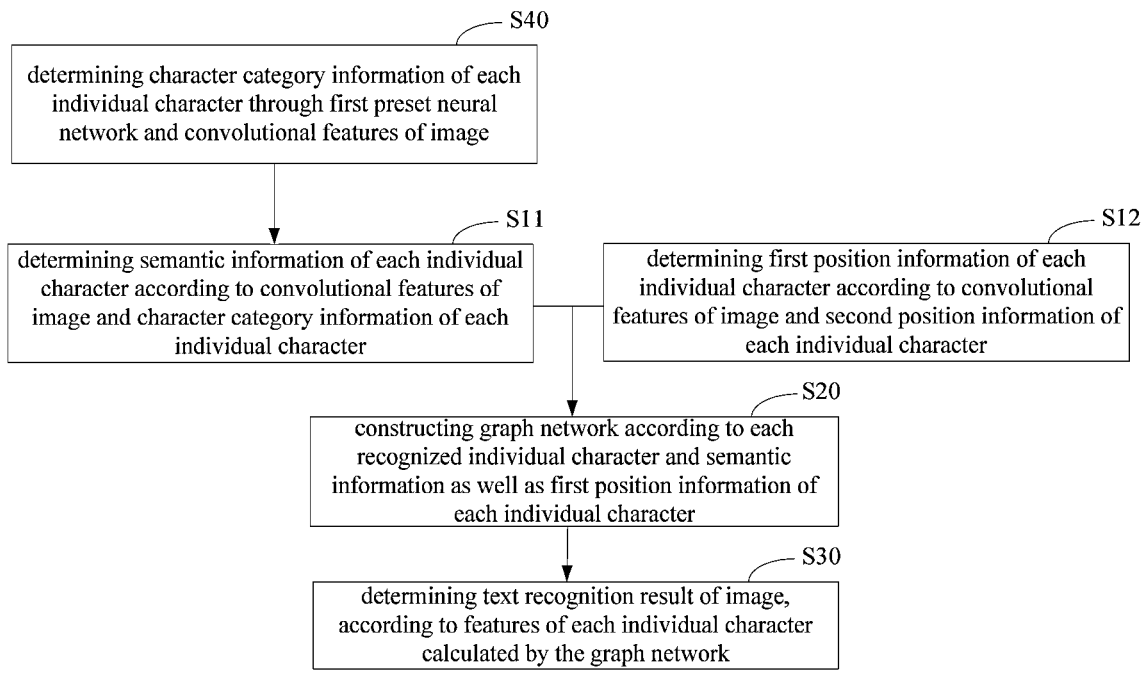
FIG. 4 is a schematic diagram of a character recognition method according to another embodiment of the present application.

In one embodiment, as shown in FIG. 4, a character recognition method including the steps S11, S12, S20 and S30 of the foregoing various embodiments. Specific content of each step may refer to the description of the foregoing embodiments, which will not be repeated in this embodiment. On this basis, before performing the step S11 of the determining the semantic information of each individual character according to the convolutional features of the image and the character category information of each individual character, the method further include a step of:

S40: determining the character category information of each individual character through a first preset neural network and the convolutional features of the image. The character category information includes a probability that each feature point corresponding to each individual character belongs to any character category.

The character category information including the probability that each feature point corresponding to each individual character belongs to any character category, may be understood as that a probability that the feature point is a Chinese character is 90%, a probability that the feature point is a letter is 5%, and a probability that the feature point is a punctuation mark is 5%. For another example, a probability that the feature point is the letter "a" is 95%, and a probability that the feature point is the letter "o" is 5%.

The convolutional features of the image may include features obtained by using a convolutional neural network to perform calculation on the image. The specific convolutional neural network used may be selected and adjusted as needed. For example, AlexNet, GoogleNet, ResNet and the like may be used. The convolutional features of the image may include feature vectors representing color, texture, shape, spatial relationship, etc., or may also include higher-order feature vectors obtained after performing convolution based on the feature vectors representing color, texture, shape, spatial relationship, etc.

The first preset neural network may include a neural network composed of multiple convolutional layers. An input of the first preset neural network may include the convolutional features of the image. The first preset neural network outputs a feature graph of the image by performing calculation on the convolutional features of the image. Each feature point in the feature graph contains at least probability information that it is a certain character category.

In this embodiment, by performing calculation on the convolutional features of the image through the first preset neural network, the character category information associated with each individual character can be effectively obtained.

In one example, the output feature graph includes at least a channel for representing the number of character categories and a channel for representing an image background category.

In one example, the network for extracting the convolutional features of the image and the first preset neural network may be included in a fully convolutional neural network. In other words, the network for extracting convolutional features of a target feature image and the first preset neural network are two-layer structures in the fully convolutional neural network.

Figure 5:
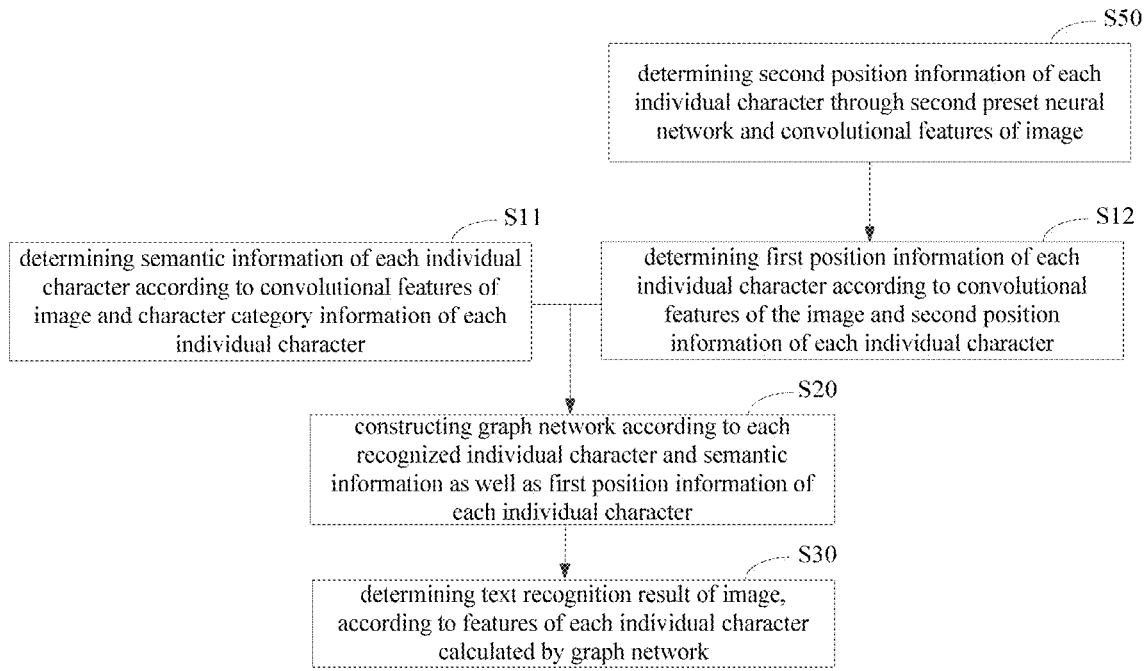
FIG. 5 is a schematic diagram of a character recognition method according to another embodiment of the present application.

In one embodiment, as shown in FIG. 5, a character recognition method including the steps S11, S12, S20 and S30 of the foregoing various embodiments. Specific content of each step may refer to the description of the foregoing embodiments, which will not be repeated in this embodiment. On this basis, before performing the step S12 of determining the first position information of each individual character according to the convolutional features of the image and the second position information of each individual character, the method further include a step of:

S50: determining the second position information of each individual character through a second preset neural network and the convolutional features of the image. The second position information includes at least coordinate information and angle information of each feature point corresponding to each individual character.

The convolutional features of the image may include features obtained by using a convolutional neural network to perform calculation on the image. The specific convolutional neural network used may be selected and adjusted as needed. For example, AlexNet, GoogleNet, ResNet and the like may be used. The convolutional features of the image may include feature vectors representing color, texture, shape, spatial relationship, etc., or may also include higher-order feature vectors obtained after performing convolution based on the feature vectors representing color, texture, shape, spatial relationship, etc.

The second preset neural network may include a neural network composed of multiple convolutional layers. An input of the second preset neural network may include the convolutional features of the image. The second preset neural network determines a general position area of each individual character in the image by performing calculation on the convolutional features of the image. Based on the determined general position area, the second preset neural network determines coordinate information and angle information of each feature point corresponding to each individual character in the general position area.

In this embodiment, by performing calculation on the convolutional features of the image through the second preset neural network, the second position information associated with each individual character can be effectively obtained.

In one example, according to the input convolutional features of the image, the second preset neural network outputs two parts of calculation results. One part of the calculation results is a single-channel 0/1 segmentation graph, which is used to represent segmentation of foreground and background of the image (the foreground is 1, and the background is 0). The other part of the calculation results contains coordinate information (x, y, w, h) and angle information (θ) of a feature point or a pixel corresponding to each individual character. The two parts of calculation results may be fused and then displayed in one feature graph.

In one example, the first preset neural network, the second preset neural network, and the neural network for extracting the convolutional features of the image may form a fully convolutional neural network, that is to say, the three are three-layer structures of the fully convolutional neural network, respectively.

In one example, the foregoing steps S40 and S50 may be performed by an individual character detection and recognition module. This module completes detection and recognition of individual character position for a character. An input of the individual character detection and recognition module is an image. First, a basic network (such as Resnet50) is used to extract convolutional features of the image. Then, individual character positions and classification results are output through parallel detection and recognition branches. The individual character detection and recognition module requires individual-character-level position and category labeling, which may be achieved by pre-training with a large amount of synthetic data containing individual-character position labeling and then tuning with a small amount of real data in actual training.

The detection branch completes the output of the second position information of the individual character. The detection branch is composed of multiple convolutional layers. An input of the detection branch is the convolutional features output from the basic network. An output of the detection branch includes two parts. One part is a single-channel 0/1 segmentation graph, which is used to represent segmentation of foreground and background (the foreground is 1, and the background is 0), and a network model of the detection branch uses the dice loss function for supervised learning. One part is geometric information of the individual character position, including 5 channels of coordinate information (x, y, w, h) and angle information (θ), and the smoothl1 loss function is used for supervised learning.

The recognition branch completes classification of individual characters, and is also composed of multiple convolutional layers. An input of the recognition branch is the convolutional features output by the basic network. An output of the recognition branch is a segmentation graph containing (the number of categories plus 1) channels, where the number of categories is the number of character categories to be recognized, and "1" is the background category. The feature graph indicates a probability that the pixel belongs to a certain character category. The cross-entropy loss function is used for supervised learning.

In one example, the foregoing steps S10 to S30 may be performed by a word-level character detection and recognition module. Since the output result of the individual character detection and recognition module only considers the feature information of the individual character, position and classification results may be inaccurate or wrong. A purpose of the word-level character detection and recognition module is to take individual character information as input, comprehensively consider visual and semantic information of characters, use the graph network to decode position and recognition results of the characters in parallel, and correct errors in a previous module to achieve a better end-to-end recognition effect.

The word-level character detection and recognition module needs to extract the first position information and semantic information. For each individual character, corresponding convolutional features may be obtained through regional feature extraction operation. Coordinate information (x, y, w, h) and angle information (θ) as additional geometric information, and convolutional features are combined together as the first position information of the individual character. The semantic information uses features, which are extracted from the recognition branch output layer of the individual character detection and recognition module via the regional feature extraction operation, as semantic coding.

The word-level character detection and recognition module further needs to perform decoding based on the first position information and semantic information from the graph network to obtain fusion features of the individual character. Specifically, the module takes individual characters as nodes to construct a visual graph network and a semantic graph network, respectively. Initial connection relationships of edges in the graph is determined by distances of the first position information and the semantic information of the individual characters. By constructing a multi-layer graph network structure, enhance feature learning is enhanced. Meanwhile, by sharing connection relationship, it can ensure mutual circulation of the first position information and the semantic information and promote each other. Finally, the first position information and semantic information are fused by two output branches including the detection branch and the recognition branch which are connected in parallel. The detection branch obtains word-level instances by performing node classification (whether it is a character) and predicting connection relationships between edges, and uses the cross-entropy loss function for supervised learning. The recognition branch predicts a word-level recognition result, uses annotations to determine instances in the training phase, uses a prediction result of the detection branch in a prediction phase, and use the connectionist temporal classification (CTC) loss function for supervised learning.

Figure 6:
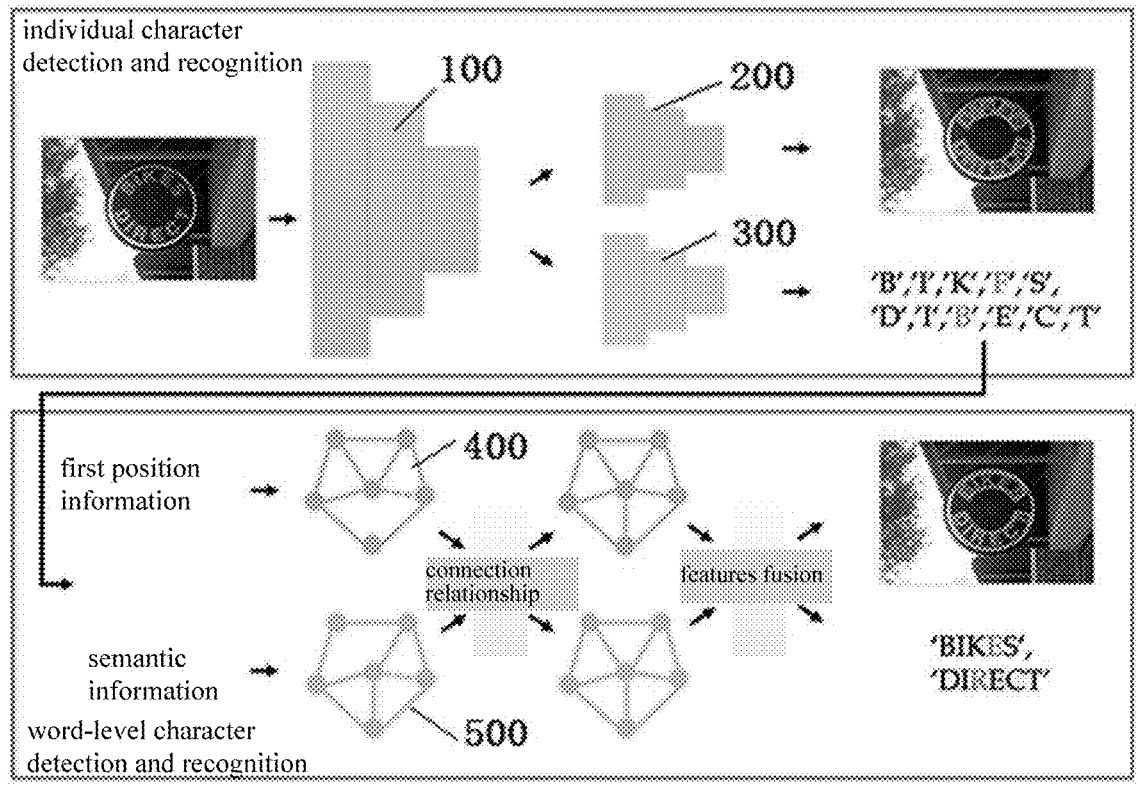
FIG. 6 is a schematic diagram of a character recognition method according to another embodiment of the present application.

In one example, as shown in FIG. 6, the character recognition method includes an individual character detection and recognition process, and a word-level detection and recognition process.

The individual character detection and recognition process is as follows. An image is input into a fully convolutional neural network. The fully convolutional neural network first obtains convolutional features of the image through a basic network 100. Then, a first preset neural network 200 of the fully convolutional neural network determines character category information of each individual character through the convolutional features of the input image. A second preset neural network 300 of the fully convolutional neural network determines the second position information of each individual character through the convolutional features of the input image. Based on the character category information of each individual character and the second position information of each individual character, it is determined that individual characters included in the image are "B", "I", "K", "F", "S", "D", "I", "B", "E", "C", "T".

The word-level detection and recognition process is as follow. Based on the character category information and the second position information of each individual character, first position information and semantic information of each individual character are determined. Each individual character is taken as a first node of a visual graph network, and the edge relationship among respective first nodes are determined based on the first position information of each individual character, thereby completing construction of a visual graph network 400. Each individual character is taken as a second node of a semantic graph network, and the edge relationship among respective second nodes are determined based on the semantic information of each individual character, thereby completing construction of a semantic graph network 500. Any layer of the visual graph network is connected to any layer of the semantic graph network, so that an output result of a certain layer of the visual graph network may be used as an input of a certain layer of the semantic graph network, and an output result of a certain layer of the semantic graph network may be used as an input of a certain layer of the visual graph network. After the visual graph network and the semantic graph network shares connections, the visual graph network updates the edge relationship among respective first nodes and calculates a first feature of each first node, and the semantic graph network updates the edge relationship among respective second nodes and calculates a second feature vector of respective second node. The first feature and the second feature of each node are fused, and a recognition result of the image obtained by calculation includes words "BIKES" and "DIRECT".

It can be seen from this embodiment that after calculation performed by the graph network, the wrong recognition result in the individual character detection and recognition process is effectively corrected, and the word-level recognition result is directly output.

Figure 7:
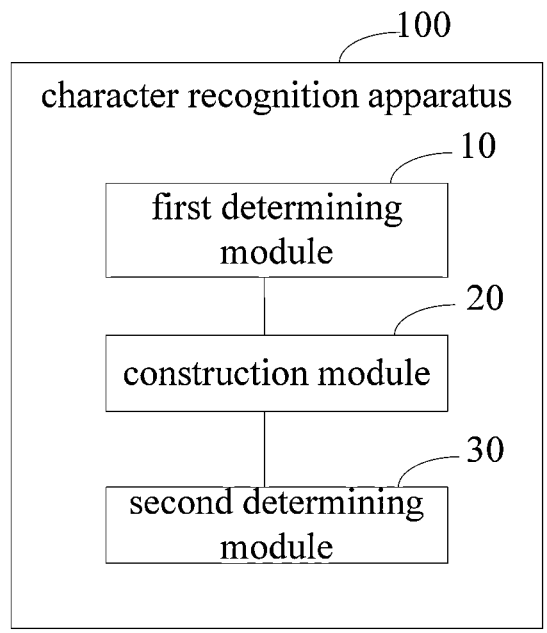
FIG. 7 is a schematic diagram of a character recognition apparatus according to an embodiment of the present application.

According to one embodiment of the present application, as shown in FIG. 7, a character recognition apparatus 100 is provided and includes:

a first determining module 10 configured for determining semantic information and first position information of each individual character recognized from an image;

a construction module 20 configured for constructing a graph network according to the semantic information and the first position information of each individual character;

a second determining module 30 configured for determining a character recognition result of the image, according to a feature of each individual character calculated by the graph network.

Figure 8:
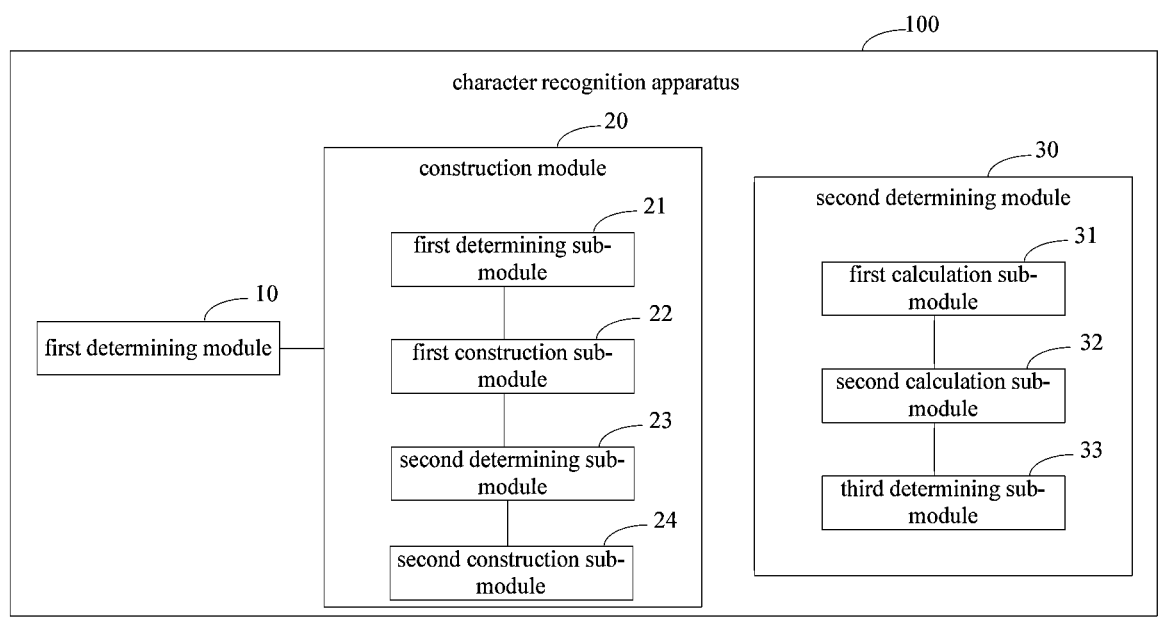
FIG. 8 is a schematic diagram of a character recognition apparatus according to another embodiment of the present application.

In one embodiment, as shown in FIG. 8, the character recognition apparatus 100 includes the first determining module 10, the construction module 20 and the second determining module 30 of the foregoing embodiment. The construction module 20 further includes:

a first determining sub-module 21 configured for determining an edge relationship among respective first nodes created by each individual character, according to the first position information of each individual character;

a first construction sub-module 22 configured for constructing a visual graph network according to the edge relationship among respective first nodes;

a second determining sub-module 23 configured for determining an edge relationship among respective second nodes created by each individual character, according to the semantic information of each individual character;

a second construction sub-module 24 configured for constructing a semantic graph network according to the edge relationship among respective second nodes.

The second determining module 30 further includes:

a first calculation sub-module 31 configured for calculating a first feature of each individual character through the visual graph network, according to the first position information of each individual character and an output result of any layer in the semantic graph network;

a second calculation sub-module 32 configured for calculating a second feature of each individual character through the semantic graph network, according to the semantic information of each individual character and an output result of any layer in the visual graph network, calculating;

a third determining sub-module 33 configured for determining the character recognition result of the image according to the first feature and the second feature of each individual character.

Figure 9:
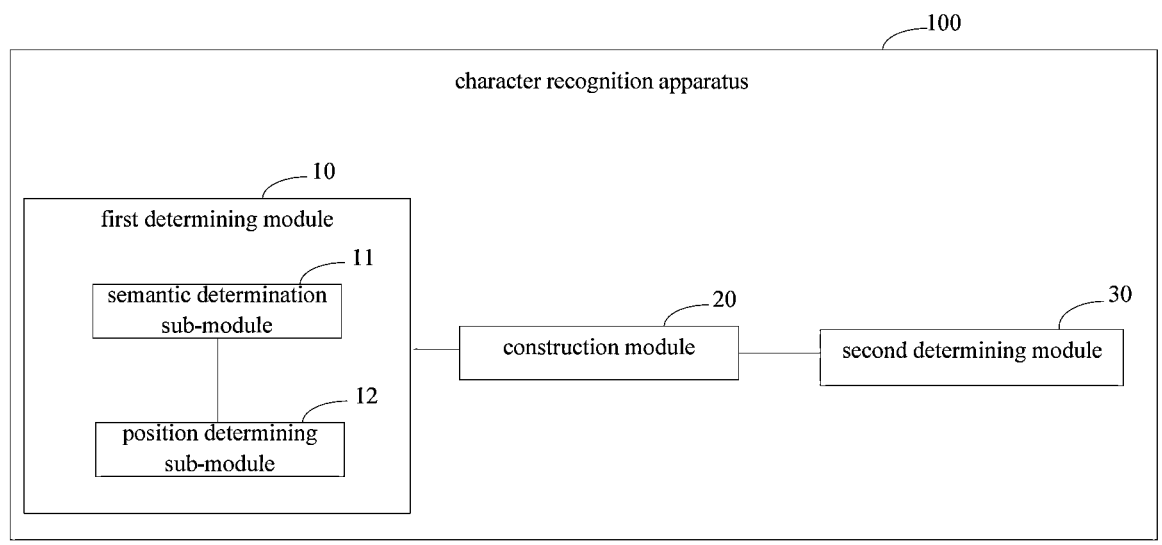
FIG. 9 is a schematic diagram of a character recognition apparatus according to another embodiment of the present application.

In one embodiment, as shown in FIG. 9, the character recognition apparatus 100 includes the first determining module 10, the construction module 20 and the second determining module 30 of the foregoing embodiment. The first determining module 10 further includes:

a semantic determination sub-module 11 configured for determining the semantic information of each individual character according to convolutional features of the image and character category information of each individual character;

a position determining sub-module 12 configured for determining the first position information of each individual character according to the convolutional features of the image and second position information of each individual character.

Figure 10:
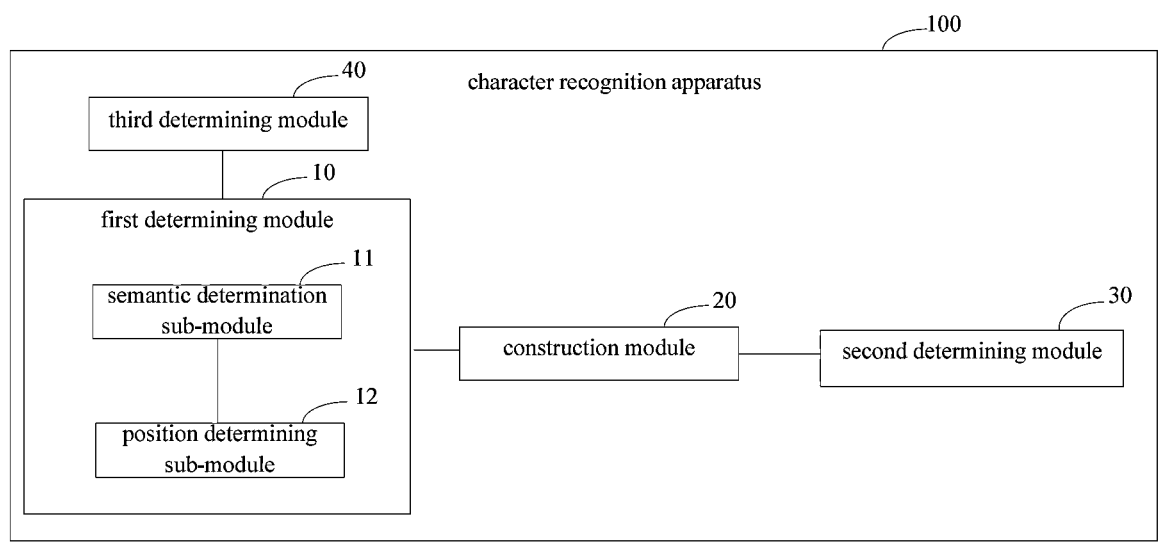
FIG. 10 is a schematic diagram of a character recognition apparatus according to another embodiment of the present application.

In one embodiment, as shown in FIG. 10, the character recognition apparatus 100 includes the first determining module 10, the construction module 20 and the second determining module 30 of the foregoing embodiment. The character recognition apparatus 100 further includes:

a third determining module 40 configured for determining the character category information of each individual character through a first preset neural network and the convolutional features of the image, where the character category information includes a probability that each feature point corresponding to each individual character belongs to any character category.

Figure 11:
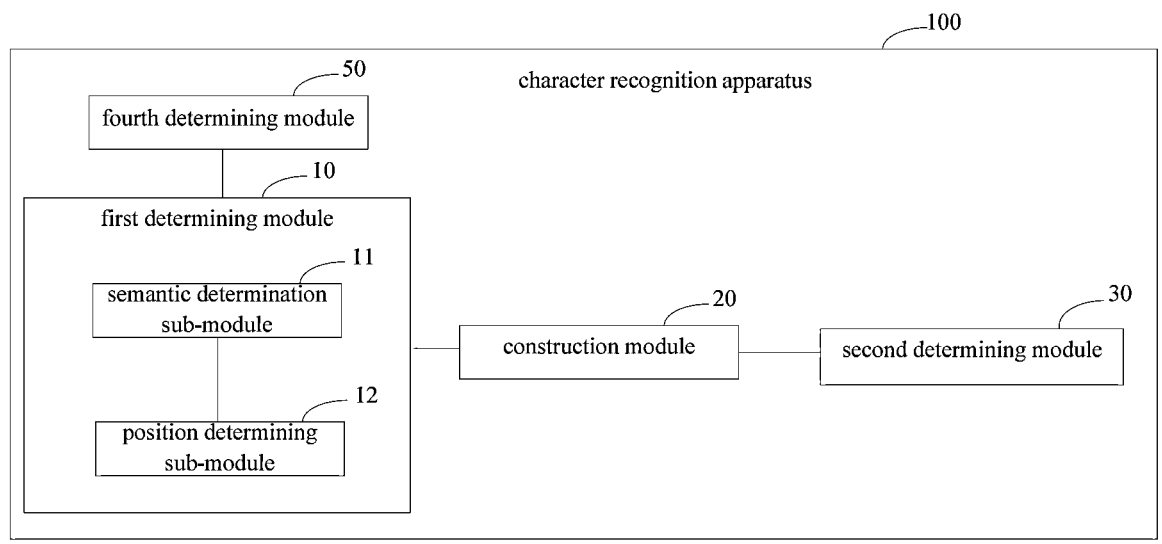
FIG. 11 is a schematic diagram of a character recognition apparatus according to another embodiment of the present application.

In one embodiment, as shown in FIG. 11, the character recognition apparatus 100 includes the first determining module 10, the construction module 20 and the second determining module 30 of the foregoing embodiment. The character recognition apparatus 100 further includes:

a fourth determining module 50 configured for determining the second position information of each individual character through a second preset neural network and the convolutional features of the image, where the second position information includes at least coordinate information and angle information of each feature point corresponding to each individual character.

According to the embodiments of the present application, the present application further provides an electronic device and a readable storage medium.

Figure 12:
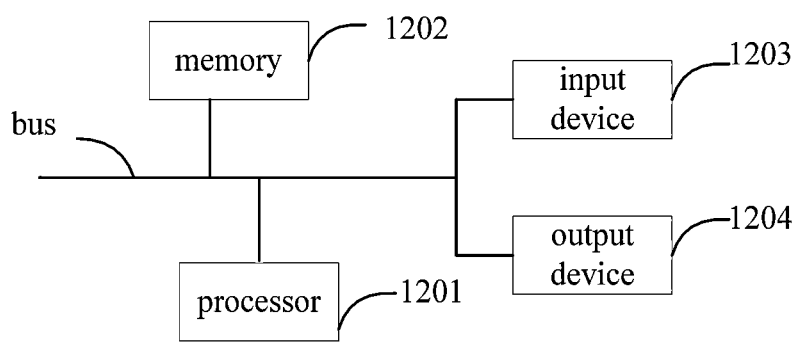
FIG. 12 is a block diagram of an electronic device for implementing a character recognition method according to an embodiment of the present application.

FIG. 12 is a block diagram of an electronic device for a character recognition method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, their connections and relationships, and their functions are by way of example only and are not intended to limit the implementations of the present application described and/or claimed herein.

As shown in FIG. 12, the electronic device includes: one or more processors 1201, a memory 1202, and interfaces for connecting various components, including high-speed interfaces and low-speed interfaces. The various components are interconnected using different buses and may be mounted on a common motherboard or otherwise as desired. The processor may process instructions for execution within the electronic device, including instructions stored in the memory or on the memory to display graphical information of a Graphical User Interface (GUI) on an external input/output device, such as a display device coupled to the interface. In other embodiments, multiple processors and/or multiple buses and multiple memories may be used with multiple memories if desired. Similarly, multiple electronic devices may be connected, each providing part of the necessary operations (e.g., as an array of servers, a set of blade servers, or a multiprocessor system). In FIG. 12, one processor 1201 is taken as an example.

The memory 1202 is a non-transitory computer-readable storage medium provided herein. The memory stores instructions executable by at least one processor to enable the at least one processor to implement the character recognition method provided herein. The non-transitory computer-readable storage medium of the present application stores computer instructions for enabling a computer to implement the character recognition method provided herein.

The memory 1202, as a non-transitory computer-readable storage medium, may be used to store non-transitory software programs, non-transitory computer-executable programs, and modules, such as program instructions/modules (e.g., the first determining module 10, the construction module 20 and the second determining module 30 shown in FIG. 7) corresponding to the character recognition method of embodiments of the present application. The processor 1201 executes various functional applications of the server and data processing, i.e., a character recognition method in the above-mentioned method embodiment, by operating non-transitory software programs, instructions, and modules stored in the memory 1202.

The memory 1202 may include a program storage area and a data storage area, wherein the program storage area may store an application program required by an operating system and at least one function; the data storage area may store data created according to the use of the electronic device for the character recognition method, etc. In addition, the memory 1202 may include a high speed random access memory, and may also include a non-transitory memory, such as at least one magnetic disk storage device, a flash memory device, or other non-transitory solid state memory device. In some embodiments, the memory 1202 may optionally include memories remotely located with respect to processor 1201, which may be connected via a network to the electronic device of the character recognition method. Examples of such networks include, but are not limited to, the Internet, intranet, local area networks, mobile communication networks, and combinations thereof.

The electronic device for the character recognition method may further include: an input device 1203 and an output device 1204. The processor 1201, the memory 1202, the input device 1203, and the output device 1204 may be connected via a bus or otherwise. FIG. 12 takes a bus connection as an example.

The input device 1203 may receive input numeric or character information and generate key signal inputs related to user settings and functional controls of the electronic device of the character recognition method, such as input devices including touch screens, keypads, mice, track pads, touch pads, pointing sticks, one or more mouse buttons, trackballs, joysticks, etc. The output device 1204 may include display devices, auxiliary lighting devices (e.g., LEDs), tactile feedback devices (e.g., vibration motors), and the like. The display device may include, but is not limited to, a Liquid Crystal Display (LCD), a Light Emitting Diode (LED) display, and a plasma display. In some embodiments, the display device may be a touch screen.

Various embodiments of the systems and techniques described herein may be implemented in digital electronic circuit systems, integrated circuit systems, Application Specific Integrated Circuits (ASICs), computer hardware, firmware, software, and/or combinations thereof. These various embodiments may include: implementation in one or more computer programs which can be executed and/or interpreted on a programmable system including at least one programmable processor, and the programmable processor may be a dedicated or general-purpose programmable processor which can receive data and instructions from, and transmit data and instructions to, a memory system, at least one input device, and at least one output device.

These computing programs (also referred to as programs, software, software applications, or codes) include machine instructions of a programmable processor, and may be implemented using high-level procedural and/or object-oriented programming languages, and/or assembly/machine languages. As used herein, the terms "machine-readable medium" and "computer-readable medium" refer to any computer program product, device, and/or apparatus (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide an interaction with a user, the systems and techniques described herein may be implemented on a computer having: a display device (e.g., a Cathode Ray Tube (CRT) or Liquid Crystal Display (LCD) monitor) for displaying information to a user; and a keyboard and a pointing device (e.g., a mouse or a trackball) by which a user can provide input to the computer. Other types of devices may also be used to provide interaction with a user; for example, the feedback provided to the user may be any form of sensory feedback (e.g., visual feedback, audile feedback, or tactile feedback); and input from the user may be received in any form, including acoustic input, audio input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background component, middleware component, or front-end component. The components of the system may be interconnected by digital data communication (e.g., a communication network) of any form or medium. Examples of the communication network include: Local Area Networks (LANs), Wide Area Networks (WANs), and the Internet.

The computer system may include a client and a server. The client and the server are typically remote from each other and typically interact through a communication network. A relationship between the client and the server is generated by computer programs operating on respective computers and having a client-server relationship with each other.

The technical solution according to the embodiments of the present application have at least the following technical effects.

1. Since connection relationship is established between the visual graph network constructed based on the first position information and the semantic graph network constructed based on the semantic information, complementarity of information of different dimensions can be fully utilized, so that the visual graph network can use intermediate data of the semantic graph network for auxiliary calculations when the visual graph network performs calculation, and the semantic graph network can use intermediate data of the visual graph network for auxiliary calculations when the semantic graph network performs calculation. In this way, feature mining effects of the semantic graph network and the visual graph network on the individual character can be improved, and final calculated features of the individual character can be more accurate.

2. Since the first position information and semantic information of the individual character are used for calculation, it can be adapted to character recognition in more scenarios. This method enables the application of character recognition to have better scalability, and may be applied to recognition of cards and bills, automatic entry of documents and photo search, and even structural analysis of documents.

3. By deeply combining visual information (position information) and semantic information, the end-to-end detection and recognition problem can be better solved. In many optical character recognition (OCR) tasks, it can locate character positions and recognize character content more quickly and accurately, thereby innovating the OCR technology, facilitating expansion of high-end tasks, and bringing more traffic and better user experience in OCR applications on the cloud and mobile.

It will be appreciated that the various forms of flow, reordering, adding or removing steps shown above may be used. For example, the steps recited in the present application may be performed in parallel or sequentially or may be performed in a different order, so long as the desired results of the technical solutions disclosed in the present application can be achieved, and no limitation is made herein.

The above-mentioned embodiments are not to be construed as limiting the scope of the present application. It will be apparent to a person skilled in the art that various modifications, combinations, sub-combinations and substitutions are possible, depending on design requirements and other factors. Any modifications, equivalents, and improvements within the spirit and principles of this application are intended to be included within the scope of the present application.

What is claimed is:

1. A character recognition method, comprising:
    determining semantic information and first position information of each individual character recognized from an image, wherein the semantic information comprises at least character category information and convolutional features of the image;
    constructing a graph network according to the semantic information and the first position information of each individual character; and
    determining a character recognition result of the image according to a feature of each individual character calculated by the graph network,
    wherein, the determining the semantic information and the first position information of each individual character recognized from the image, comprises:
        determining the semantic information of each individual character according to convolutional features of the image and character category information of each individual character; and
        determining the first position information of each individual character according to the convolutional features of the image and second position information of each individual character; and
    wherein the method further comprises:
        before the determining the semantic information of each individual character according to the convolutional features of the image and the character category information of each individual character, determining the character category information of each individual character through a first preset neural network and the convolutional features of the image, wherein the character category information comprises a probability that each feature point corresponding to each individual character belongs to any character category.

2. The method of claim 1, wherein, the constructing the graph network according to the semantic information and the first position information of each individual character, comprises:

determining an edge relationship among respective first nodes created by each individual character, according to the first position information of each individual character;

constructing a visual graph network according to the edge relationship among respective first nodes;

determining an edge relationship among respective second nodes created by each individual character, according to the semantic information of each individual character; and constructing a semantic graph network according to the edge relationship among respective second nodes; and wherein, the determining the character recognition result of the image according to the feature of each individual character calculated by the graph network, comprises:

calculating a first feature of each individual character through the visual graph network, according to the first position information of each individual character and an output result of any layer in the semantic graph network;

calculating a second feature of each individual character through the semantic graph network, according to the semantic information of each individual character and an output result of any layer in the visual graph network; and determining the character recognition result of the image according to the first feature and the second feature of each individual character.

3. A non-transitory computer-readable storage medium storing computer instructions for causing the computer to perform the method of claim 2.

4. The method of claim 1, further comprising:

before the determining the first position information of each individual character according to the convolutional features of the image and the second position information of each individual character, determining the second position information of each individual character through a second preset neural network and the convolutional features of the image, wherein the second position information comprises at least coordinate information and angle information of each feature point corresponding to each individual character.

5. A non-transitory computer-readable storage medium storing computer instructions for causing the computer to perform the method of claim 4.

6. A non-transitory computer-readable storage medium storing computer instructions for causing the computer to perform the method of claim 1.

7. A character recognition apparatus, comprising:

a processor and a memory for storing one or more computer programs executable by the processor, wherein when executing at least one of the computer programs, the processor is configured to perform operations comprising:

determining semantic information and first position information of each individual character recognized from an image, wherein the semantic information comprises at least character category information and convolutional features of the image;

constructing a graph network according to the semantic information and first position information of each individual character; and determining a character recognition result of the image according to a feature of each individual character calculated by the graph network;

wherein when executing at least one of the computer programs, the processor is further configured to perform operations comprising:

determining the semantic information of each individual character according to convolutional features of the image and character category information of each individual character; and determining the first position information of each individual character according to the convolutional features of the image and second position information of each individual character; and wherein when executing at least one of the computer programs, the processor is further configured to perform operations comprising:

determining the character category information of each individual character through a first preset neural network and the convolutional features of the image, wherein the character category information comprises a probability that each feature point corresponding to each individual character belongs to any character category.

8. The apparatus of claim 7, wherein when executing at least one of the computer programs, the processor is further configured to perform operations comprising:

determining an edge relationship among respective first nodes created by each individual character, according to the first position information of each individual character;

constructing a visual graph network according to the edge relationship among respective first nodes;

determining an edge relationship among respective second nodes created by each individual character, according to the semantic information of each individual character; and constructing a semantic graph network according to the edge relationship among respective second nodes;

and wherein when executing at least one of the computer programs, the processor is further configured to perform operations comprising:

calculating a first feature of each individual character through the visual graph network, according to the first position information of each individual character and an output result of any layer in the semantic graph network;

calculating a second feature of each individual character through the semantic graph network, according to the semantic information of each individual character and an output result of any layer in the visual graph network, calculating; and determining the character recognition result of the image according to the first feature and the second feature of each individual character.

9. The apparatus of claim 7, when executing at least one of the computer programs, the processor is further configured to perform operations comprising:

determining the second position information of each individual character through a second preset neural network and the convolutional features of the image, wherein the second position information comprises at least coordinate information and angle information of each feature point corresponding to each individual character.

* * * * *